United States Patent
Horiuchi et al.

(10) Patent No.: US 8,178,260 B2
(45) Date of Patent: May 15, 2012

(54) FUEL CELL ELECTRODE CATALYST WITH REDUCED NOBLE METAL AMOUNT AND SOLID POLYMER FUEL CELL COMPRISING THE SAME

(75) Inventors: Yosuke Horiuchi, Toyota (JP); Tomoaki Terada, Kakegawa (JP); Takahiro Nagata, Kakegawa (JP); Toshiharu Tabata, Kakegawa (JP); Susumu Enomoto, Kakegawa (JP); Hiroaki Takahashi, Toyota (JP)

(73) Assignees: Cataler Corporation, Shizuoka (JP); Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 13/283,223

(22) Filed: Oct. 27, 2011

(65) Prior Publication Data

US 2012/0040270 A1    Feb. 16, 2012

Related U.S. Application Data

(62) Division of application No. 12/294,601, filed as application No. PCT/JP2007/057629 on Mar. 29, 2007.

(30) Foreign Application Priority Data

Mar. 30, 2006 (JP) .................... 2006-092755

(51) Int. Cl.
  *H01M 4/02* (2006.01)
(52) U.S. Cl. ........................ 429/524; 429/523

(58) Field of Classification Search .................. 429/484, 429/485, 523, 524, 525, 526, 527, 532
  See application file for complete search history.

(56) References Cited

U.S. PATENT DOCUMENTS

| | | | | |
|---|---|---|---|---|
| 4,044,193 | A | * | 8/1977 | Petrow et al. .................. 429/442 |
| 6,007,934 | A | * | 12/1999 | Auer et al. ..................... 429/480 |
| 6,670,301 | B2 | * | 12/2003 | Adzic et al. ................... 502/185 |
| 2001/0053468 | A1 | | 12/2001 | Kato et al. |
| 2003/0044655 | A1 | | 3/2003 | Kato et al. |
| 2004/0161850 | A1 | | 8/2004 | Kato et al. |
| 2005/0227862 | A1 | | 10/2005 | Cao et al. |
| 2005/0266980 | A1 | * | 12/2005 | Mada Kannan et al. ....... 502/101 |

FOREIGN PATENT DOCUMENTS

GB    1 508 649    4/1978

(Continued)

OTHER PUBLICATIONS

T. Tada, "Handbook of Fuel Cells—Fundamentals, Technology and Applications", Chapter 38—High dispersion catalysts including novel carbon supports, pp. 481-485 (2003).

(Continued)

*Primary Examiner* — Jerry Lorengo
*Assistant Examiner* — Carlos Barcena
(74) *Attorney, Agent, or Firm* — Finnegan, Henderson, Farabow, Garrett & Dunner, LLP

(57) ABSTRACT

An object of the present invention is to reduce the amount of catalytic metal such as Pt in a fuel cell. The present invention provides a fuel cell electrode catalyst comprising a conductive carrier and catalytic metal particles, wherein the CO adsorption amount of the electrode catalyst is at least 30mL/g·Pt.

4 Claims, 2 Drawing Sheets

| | FOREIGN PATENT DOCUMENTS | |
|---|---|---|
| JP | 8-148151 | 6/1996 |
| JP | 2001-216991 | 8/2001 |
| JP | 2004-134299 | 4/2004 |
| JP | 2004-220851 | 8/2004 |
| JP | 2004-335252 | 11/2004 |
| JP | 2005-85607 | 3/2005 |
| JP | 2005-166409 | 6/2005 |
| WO | WO 2004/028201 A1 | 4/2004 |

OTHER PUBLICATIONS

Erti, G., et al., "Handbook of Heterongeneous Catalysis," Wiley ISBN: 3-527-29212-8, vol. 2, pp. 442-446, Dec. 31, 1997.

Official Communication from the European Patent Office for EP Appln. No. 07 741 065.2 dated Oct. 7, 2010.

* cited by examiner

FUEL CELL ELECTRODE CATALYST WITH REDUCED NOBLE METAL AMOUNT AND SOLID POLYMER FUEL CELL COMPRISING THE SAME

This is a divisional application of U.S. application Ser. No. 12/294,601 filed Sep. 25, 2008, which is a national phase of international application No. PCT/JP2007/057629, filed Mar. 29, 2007, which claims priority to Japanese application No. 2006-092755, filed Mar. 30, 2006. Each of these applications is incorporated herein by reference.

TECHNICAL FIELD

The present invention relates to a fuel cell electrode catalyst with a reduced noble metal amount, and a solid polymer fuel cell comprising the fuel cell electrode catalyst.

BACKGROUND ART

The sizes of solid polymer fuel cells, having polymer electrolyte membranes, can be easily reduced. The solid polymer fuel cells are thus expected to be applied to mobile vehicles such as electric cars and power sources for small cogeneration systems. However, the solid polymer fuel cells operate at relatively low temperatures. Further, it is difficult to effectively utilize waste heat from them for auxiliary power or the like. Accordingly, to be put to practical use, the solid polymer fuel cells need to offer a high generation efficiency and a high power density under operating conditions including a high anode reaction gas (pure water or the like) utilization rate and a high cathode reaction gas (air or the like) utilization rate.

An electrode reaction in a catalyst layer in each of the anode and cathode of the solid polymer fuel cell occurs at a three phase interface (hereinafter referred to as a reaction site) where reaction gases, a catalyst, and a fluorine containing ion exchange resin are simultaneously present. Thus, the reaction in each electrode occurs only at the three phase interface, where gas (hydrogen or oxygen) corresponding to an active substance, protons ($H^+$), and electrons ($e^-$) can be simultaneously transferred to one another.

An example of an electrode having this function is a solid polymer electrode-catalyst composite electrode containing a solid polymer electrolyte, carbon particles, and a catalytic substance. For example, in this electrode, the carbon particles carrying the catalytic substance are mixed with the solid polymer electrolyte so that the carbon particles, catalytic substance, and solid polymer electrolyte are three-dimensionally distributed. Further, a plurality of pores are formed inside the electrode, which is thus porous. The carbon, a carrier of the catalyst, forms an electron conducting channel. The solid electrolyte forms a proton conducting channel. The pores form a supply and discharge channel for oxygen, hydrogen or water. These three channels spread three-dimensionally in the electrode to form countless three phase interfaces, where the gas, protons ($H^+$), and electrons ($e^-$) can be simultaneously transferred to one another. This provides a field for electrode reactions.

Thus, for the conventional solid polymer fuel cells, a catalyst such as a metal catalyst or a metal carrying catalyst (for example, metal carrying carbon comprising a carbon black carrier with a large specific surface area and a metal catalyst such as platinum carried by the carbon, black carrier) is coated with the same fluorine containing ion exchange resin as or a fluorine containing ion change resin different from that contained in the polymer electrolyte membrane. The catalyst coated with the fluorine containing ion exchange resin is then used as a component of the catalyst layer to perform what is called an operation of making the reaction sites in the catalyst layer three-dimensional. This increases the number of reaction sites and improves the utilization efficiency of expensive noble metal such as platinum, corresponding to the catalytic metal.

Putting fuel cell cars to practical use requires a drastic reduction in costs. However, with the conventional fuel cell catalysts, a reduction in the amount of noble metal in one of the anode and cathode may disadvantageously sharply reduce resultant power owing to the very high activity of the noble metal.

Thus, to reduce the amount of catalyst, JP Patent Publication (Kokai) No. 8-148151 A (1996) discloses the invention of a fuel cell electrode comprising a catalyst layer formed on the gas diffusion layer and containing catalytic particles carrying an active metal, wherein the catalyst layer comprises multiple layers of catalytic particles of different carried active metal amounts.

Thus, the conventional techniques for reducing the noble metal amount focus on the improvement of the electrode structure and few of them take note of the physical properties of the electrode catalyst itself.

DISCLOSURE OF THE INVENTION

The present invention has been made in view of the problems with the conventional art. An object of the present invention is to provide an electrode catalyst that does not reduce the power of a fuel cell in spite of a reduction in the used amount of catalytic metal such as Pt.

The present inventors have obtained the present invention by finding that the above object is accomplished by an electrode catalyst having particular physical properties.

First, the present invention provides a fuel cell electrode catalyst comprising a conductive carrier and catalytic metal particles, wherein the CO adsorption amount of the electrode catalyst is at least 30 mL/g·Pt. Regardless of shape or condition of the catalytic metal particles carried by the conductive carrier, catalytic performance can be appropriately evaluated using the CO adsorption amount as an index.

As the catalytic metal for the fuel cell electrode catalyst in accordance with the present invention, it is possible to use any of various catalytic metals each consisting of only a well-known noble metal or multiple elements including noble metal and other elements. Specific preferred examples of the catalytic metal include at least one selected from the group consisting of noble metal, noble metal-rare earth, noble metal-transition metal, and noble metal-transition metal-rare earth. In particular, the preferred example is platinum.

The conductive carrier for the fuel cell electrode catalyst in accordance with the present invention may be any of various well-known catalyst carriers for fuel cells. In particular, a preferred example of the conductive carrier is any of various carbon powders or a fibrous carbon material. The conductive carrier for the fuel cell electrode catalyst in accordance with the present invention preferably has a specific surface area of at least 650 $m^2$/g, more preferably at least 800 $m^2$/g. Further, the conductive carrier used is preferably anticorrosive.

By setting the CO adsorption amount of the electrode catalyst to at least 30 mL/g·Pt, more preferably at least 38 mL/g·Pt, it is possible to set the amount of catalytic metal per 1 $cm^2$ of the fuel cell electrode to at most 0.0001 mg. That is, the amount of expensive noble metal can be reduced to enhance the practicality of the fuel cell.

The fuel cell electrode catalyst in accordance with the present invention can be used for both anode and cathode. The fuel cell electrode catalyst in accordance with the present invention can be effectively used particularly as an anode catalyst to offer appropriate cell performance and to reduce the amount of noble metal used.

Second, the present invention provides a solid polymer fuel cell having an anode, a cathode, and a polymer electrolyte membrane located between the anode and the cathode, the solid polymer fuel cell comprising the fuel cell electrode catalyst as an electrode catalyst for the cathode and/or anode.

The fuel cell electrode catalyst in accordance with the present invention can be used for both anode and cathode and can be effectively used particularly as an anode catalyst as described above.

In spite of a successful reduction in the amount of noble metal used, the electrode catalyst in accordance with the present invention enables the provision of a solid polymer fuel cell in no way inferior to the conventional ones in cell power.

Third, the present invention provides a method for evaluating a fuel cell electrode catalyst comprising a conductive carrier and catalytic metal particles, the method using the CO adsorption amount of the electrode catalyst as an index. Using the CO adsorption amount as an index enables the fuel cell performance to be appropriately evaluated regardless of the amount of noble metal used. Specifically, catalytic performance can be evaluated on the basis of whether or not the CO adsorption amount of the electrode catalyst is at least 30 mL/g·Pt.

The present invention has enabled fuel cell electrode catalysts to be appropriately evaluated. The present invention has also enabled a high fuel cell performance to be maintained in spite of a successful reduction in the amount of noble metal used. The reduced amount of catalyst metal such as Pt contributes directly to a reduction in fuel cell costs.

BEST MODE FOR CARRYING OUT THE INVENTION

Figure 1:
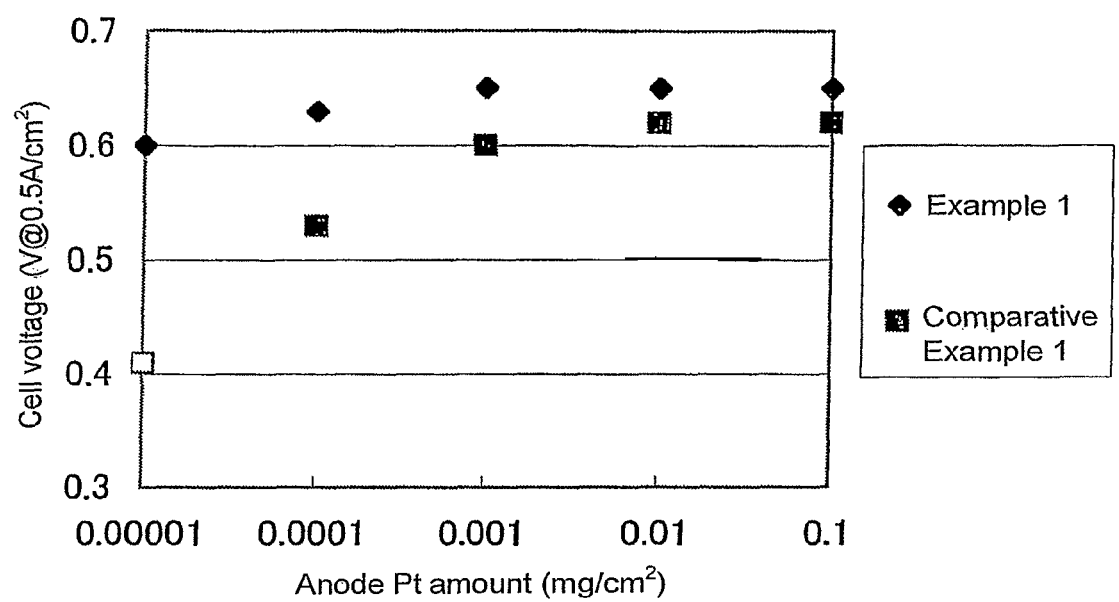
FIG. 1 shows the relationship between anode Pt amount and cell voltage.

A detailed description will be given of a preferred embodiment of a fuel cell electrode catalyst and solid polymer fuel cell comprising the fuel cell electrode catalyst in accordance with the present invention.

A metal catalyst contained in the fuel cell electrode catalyst in accordance with the present invention is not particularly limited but is preferably platinum or a platinum alloy. A metal catalyst carried by a conductive carrier is preferably carried by a conductive carrier. The conductive carrier is not particularly limited but is preferably a carbon black or an activated carbon.

A polymer electrolyte used with the fuel cell electrode catalyst in accordance with the present invention is preferably a fluorine containing ion exchange resin, particularly preferably a sulfonic perfluorocarbon polymer. The sulfonic perfluorocarbon polymer remains chemically stable in a cathode over a long period of time and enables quick proton conduction.

The layer thickness of a catalyst layer in the fuel cell electrode catalyst in accordance with the present invention may be equivalent to that of a normal gas diffusion electrode and is preferably 1 to 100 µm, more preferably 3 to 50 µm.

A polymer electrolyte membrane for the solid polymer fuel cell in accordance with the present invention is not particularly limited and may be any ion exchange membrane exhibiting a high ion conductivity in a wet condition. A solid polymer material constituting the polymer electrolyte membrane may be, for example, a perfluorocarbon polymer having a sulfonic group, a polysulfone resin, or a perfluorocarbon polymer having a phosphoric group or a carboxylic group. In particular, the sulfonic perfluorocarbon polymer is preferred. The polymer electrolyte membrane may be composed of the same fluorine containing ion exchange resin as or a fluorine containing ion exchange resin different from that contained in the catalyst layer.

The fuel cell electrode catalyst in accordance with the present invention can be produced by using a coating liquid obtained by dissolving or dispersing a metal catalyst-containing conductive carrier and a polymer electrolyte in a solvent or a dispersive medium. Alternatively, the fuel cell electrode catalyst may be produced by using a coating liquid obtained by dissolving or dispersing a catalyst-carrying conductive carrier and a polymer electrolyte in a solvent or a dispersive medium. Examples of the solvent or dispersive medium used herein include alcohol, fluorine containing alcohol, and fluorine containing ether. A catalyst layer is formed by coating the coating liquid on a carbon cloth or the like constituting an ion exchange membrane or a gas diffusion layer. Alternatively, a catalyst layer may be formed on an ion exchange membrane by coating the coating liquid on a separately prepared base to form a coating layer and transferring the coating layer to the ion exchange membrane.

Here, if the fuel cell electrode catalyst layer is formed on the gas diffusion layer, the catalyst layer and the ion exchange membrane are preferably joined together by an adhesive process or hot press process. If the catalyst layer is formed on the ion exchange membrane, the cathode may be composed only of the catalyst layer or of the catalyst layer and the gas diffusion layer placed adjacent to the catalyst layer.

A separator with a gas channel formed therein is normally located outside the cathode. The channel is supplied with hydrogen containing gas for the anode and oxygen containing gas for the cathode. The solid polymer fuel cell is configured as described above.

In the present invention, the reason why the CO adsorption amount of the electrode catalyst constitutes an index for a reduction in noble metal amount is not very clear. However, a possible reason is that the CO adsorption amount is not very sensitive to the shape, particle size, or carrying condition of the noble metal such as Pt on the conductive carrier and that the CO adsorption amount has a strong correlation with the surface area of surface of the noble metal which adsorbs CO.

[EXAMPLES]

The cathode and solid polymer fuel cell in accordance with the present invention will be described below in detail with reference to examples and comparative examples.

[Example 1]

First, 3.5 g of Ketjen EC (specific surface area: 800 m$^2$/g) was added to and dispersed in 0.4 L of pure water. A hexahydroxo platinum nitrate solution containing 1.5 g of platinum was dropped into the fluid dispersion, which was sufficiently blended with the carbon. About 10 mL of 0.075 N ammonia was added to the fluid dispersion and the fluid dispersion had prepared a pH of about 12. A hydroxide was thus formed and precipitated on the carbon. The fluid dispersion was washed, and a powder obtained was dried in a vacuum at 100° C. for 24 hours. The platinum carrying catalytic powder obtained had a platinum carrying density of 30.0 wt %. XRD measurements as physical property examinations showed only a Pt peak. The average particle size was calculated to be 1.7 nm on the basis of a peak position on a Pt (111) surface near 39° and a half-value width. The CO adsorption amount as an index for the specific surface area of Pt measured 40.1 mL/g·Pt.

[Examples 2, 3, and 5 and Comparative Examples 1 to 3]

In Examples 2, 3, and 5 and Comparative Examples 1 to 3, conditions were set so as to obtain the physical properties described below, as in the case of Example 1, in order to examine the relationship between a reduction in the particle size of noble metal and a reduction in noble metal amount in the anode catalyst.

[Example 4]

First, 4.5 g of Ketjen EC (specific surface area: 800 m²/g) was added to and dispersed in 0.8 L of pure water. A hexahydroxo platinum nitrate solution containing 0.5 g of platinum was dropped into the fluid dispersion, which was sufficiently blended with the carbon. About 30 mL of 0.075 N ammonia was added to the fluid dispersion and the fluid dispersion had prepared a pH of about 12. A hydroxide was thus formed and precipitated on the carbon. The fluid dispersion was washed, and a powder obtained was dried at 100° C. for 24 hours.

In this example, the components were suspended in water the amount of which was larger than that in the method of preparing a catalyst in Example 1. This improves the dispersion of the carbon, allowing the platinum to be carried more dispersively.

The platinum carrying catalytic powder obtained had a platinum carrying density of 5.0 wt %. XRD measurements as physical property examinations showed only a Pt peak. The average particle size was calculated to be 1.3 nm on the basis of the peak position on the Pt (111) surface near 39° and the half-value width. The CO adsorption amount as an index for the specific surface area of Pt measured 67.6 mL/g·Pt.

Table 1 shows the physical properties of the platinum carrying catalytic powder obtained.

TABLE 1

| | Pt carrying amount (%) | CO adsorption amount (mL/g · Pt) | Average particle size (nm) | Reference numerals in the figure of the separate sheet |
|---|---|---|---|---|
| Example 1 | 30 | 40.1 | 1.7 | (1) |
| Example 2 | 30 | 51.4 | 1.3 | (2) |
| Example 3 | 30 | 62.6 | 1.1 | (3) |
| Example 4 | 5 | 67.6 | 1.0 | (4) |
| Example 5 | 30 | 38.3 | 1.9 | (5) |
| Comparative Example 1 | 30 | 16.3 | 3.1 | (6) |
| Comparative Example 2 | 30 | 22.4 | 2.6 | (7) |
| Comparative Example 3 | 30 | 20.7 | 4.0 | (8) |

[Performance Evaluations]

The noble metal carrying catalytic powders obtained in Examples 1 to 5 and Comparative Examples 1 to 3 were used to form unit cells for the solid polymer fuel cell as described below. Electrodes were formed by dispersing each metal carrying catalytic powder in a mixed solution of an organic solvent and a conductive material and spray-coating the fluid dispersion on an electrolyte membrane so that the amount of Pt catalyst per 1 cm² of electrode area was 0.00001, 0.0001, 0.001, 0.01, or 0.1 mg/cm². Diffusion layers were installed on the respective sides of each electrode to form unit cell electrodes. The cathode of the cell was supplied with 1 L/min of humidified air passed through a bubbler heated to 70° C. The anode of the cell was supplied with 0.5 L/min of humidified hydrogen passed through the bubbler heated to 85° C.

FIG. 1 shows the relationship between anode Pt amount and cell voltage. The figure indicates that the relationship between the dependence on the anode Pt amount and the cell voltage is such that a catalyst with a large CO adsorption amount such as the one in Example 1 is unlikely to be degraded in spite of a reduction in the amount of the noble metal in the anode. For example, a high generation performance can be maintained even when the amount of Pt per 1 cm² of the anode is at most 0.0001 or 0.00001 mg.

Figure 2:
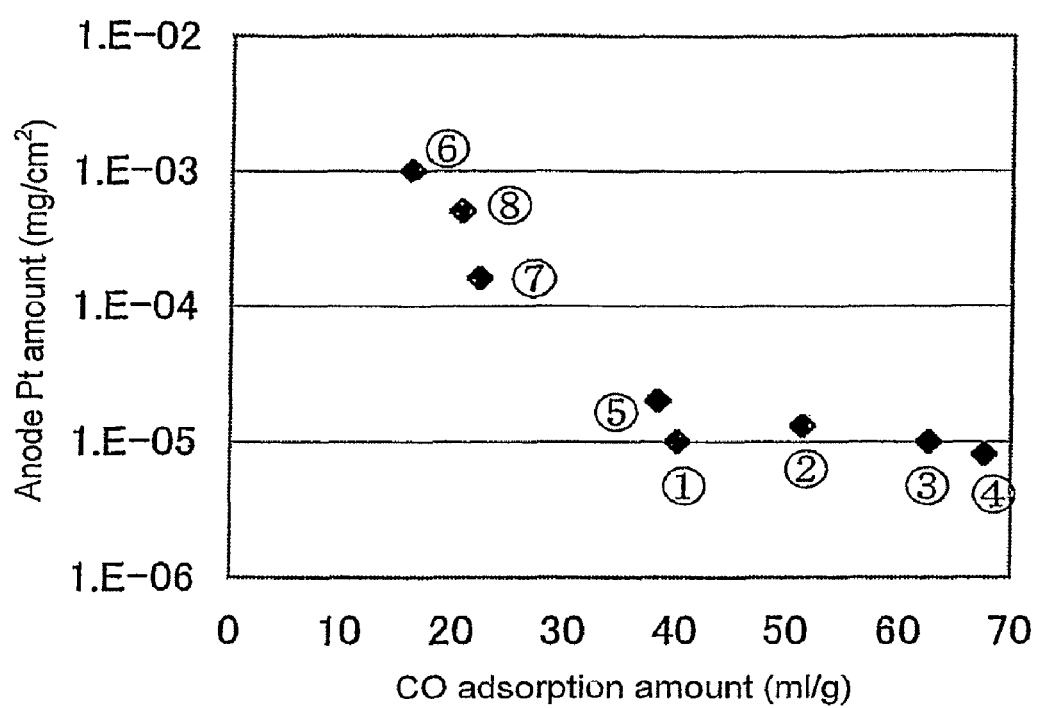
FIG. 2 shows the relationship between anode Pt amount and CO absorption amount in connection with an initial performance of 0.6 V.

FIG. 2 shows the relationship between the anode Pt amount and CO adsorption amount in connection with an initial performance of 0.6 V. The figure indicates that the initial cell performance of 0.6 V can be sufficiently ensured in spite of a reduction in the amount of the noble metal in the anode by using, as the anode, any of the noble metal carrying catalysts in Examples 1 to 5, for which the corresponding electrode catalysts exhibited a CO adsorption amount of at least 30 mL/g·Pt. In contrast, the initial cell performance of 0.6 V cannot be ensured by using, as the anode, any of the noble metal carrying catalysts in Comparative Examples 1 to 3, for which the corresponding electrode catalysts exhibited a catalyst CO adsorption amount of less than 30 mL/g·Pt, unless the noble metal amount is increased.

This is because the oxidizing reaction of hydrogen in the anode proceeds very fast, so that with an increase in CO absorption amount resulting in a sufficient number of reaction sites, the anode did not exhibit a rate-determining compared with the cathode. Carbon carriers with extremely small specific surface areas such as the one in Comparative Example 1 are limited in the enhancement of dispersion. In this case, the CO adsorption amount cannot be increased, making it difficult to reduce the noble metal amount. The reduction of the noble metal amount is also difficult with a carbon carrier with a large specific surface area and an intentionally significantly increased particle size of noble metal such as the one in Comparative Example 3.

Industrial Applicability

Using the CO adsorption amount of the electrode catalyst as an index, the present invention has enabled a reduction in the amount of noble metal carried and thus in fuel cell costs. The fuel cell electrode catalyst in accordance with the present invention contributes to the practical application and prevalence of fuel cells.

The invention claimed is:

1. A fuel cell electrode comprising an electrode catalyst wherein the electrode catalyst comprises a conductive carrier having a specific area of at least 650 m²/g and catalytic metal particles, wherein the CO adsorption amount of the electrode catalyst is at least 38 mL/g·Pt and wherein the amount of catalytic metal per 1 cm² of the electrode is at most 0.0001 mg.

2. The fuel cell electrode according to claim 1, wherein the electrode catalyst is an anode catalyst.

3. A solid polymer fuel cell having an anode, a cathode, and a polymer electrolyte membrane located between the anode and the cathode, wherein the anode and/or cathode is the fuel cell electrode according to claims 1.

4. A solid polymer fuel cell having an anode, a cathode, and a polymer electrolyte membrane located between the anode and the cathode, wherein the anode is the fuel cell electrode according to claim 1.

* * * * *